United States Patent
Wang et al.

(10) Patent No.: US 12,445,400 B2
(45) Date of Patent: Oct. 14, 2025

(54) METHOD, ELECTRONIC DEVICE, AND COMPUTER PROGRAM PRODUCT FOR SWITCHING CHAT OBJECT

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 18/113,135

(22) Filed: Feb. 23, 2023

(65) Prior Publication Data

US 2024/0250927 A1  Jul. 25, 2024

(30) Foreign Application Priority Data

Jan. 20, 2023 (CN) .......................... 202310108729.X

(51) Int. Cl.
*G06F 40/30* (2020.01)
*H04L 51/02* (2022.01)
*H04L 51/214* (2022.01)

(52) U.S. Cl.
CPC ............ *H04L 51/214* (2022.05); *H04L 51/02* (2013.01)

(58) Field of Classification Search
None
See application file for complete search history.

(56) References Cited

U.S. PATENT DOCUMENTS

| | | | |
|---|---|---|---|
| 2022/0200936 A1* | 6/2022 | Higgins | H04L 51/02 |
| 2022/0374909 A1* | 11/2022 | Dunn | G06F 40/35 |
| 2022/0374956 A1* | 11/2022 | Jungmeisteris | G06F 3/0482 |
| 2022/0405524 A1* | 12/2022 | Yuan | G06N 3/0442 |

FOREIGN PATENT DOCUMENTS

CN          115017918 A  *  9/2022

OTHER PUBLICATIONS

S. M. Lundberg et al., "A Unified Approach to Interpreting Model Predictions," arXiv:1705.07874v2, Nov. 25, 2017, 10 pages.
J. Liu et al., "A Role-Selected Sharing Network for Joint Machine-Human Chatting Handoff and Service Satisfaction Analysis," arXiv:2109.08412v1, Sep. 17, 2021, 11 pages.

(Continued)

*Primary Examiner* — Shreyans A Patel
(74) *Attorney, Agent, or Firm* — Ryan, Mason & Lewis, LLP

(57) ABSTRACT

Embodiments of the present disclosure provide a method, an electronic device, and a computer program product for switching a chat object. The method includes: using a robot as a chat object to converse with a user; outputting a target sentiment score based on current discourse, historical discourse, and predicted discourse associated with the user; and switching the chat object conversing with the user from the robot to human in response to the target sentiment score indicating that the user's sentiment is a negative sentiment. Implementation of this method can improve human-machine interactivity and communication efficiency, and ensure the sustainability of communication between a chat system and a user, thus improving the user's satisfaction with a service system.

20 Claims, 5 Drawing Sheets

(56) References Cited

OTHER PUBLICATIONS

J. Devlin et al., "BERT: Pre-training of Deep Bidirectional Transformers for Language Understanding," arXiv:1810.04805v2, May 24, 2019, 16 pages.
A. Xu et al., "A New Chatbot for Customer Service on Social Media," Proceedings of the 2017 CHI Conference on Human Factors in Computing Systems, May 2017, pp. 3506-3510.
U.S. Appl. No. 18/112,084, filed in the name of Zijia Wang et al. on Feb. 21, 2023, and entitled "Method, Device, and Computer Program Product for Processing Information.".

\* cited by examiner

METHOD, ELECTRONIC DEVICE, AND COMPUTER PROGRAM PRODUCT FOR SWITCHING CHAT OBJECT

RELATED APPLICATION

The present application claims priority to Chinese Patent Application No. 202310108729.X, filed Jan. 20, 2023, and entitled "Method, Electronic Device, and Computer Program Product for Switching Chat Object," which is incorporated by reference herein in its entirety.

FIELD

Embodiments of the present disclosure relate to the technical field of computers, and more specifically, to a method, an electronic device, and a computer program product for switching a chat object.

BACKGROUND

In customer service systems of most information service providers, when customers encounter problems in using an information system, they can submit service requests (including titles, abstracts, or detailed descriptions) through a tracking and solving module of the customer service request system.

In a meta virtual world, a customer may chat with a virtual object on a client without knowing whether the virtual chat object is human or a robot. However, if the chat service is always provided by a robot, the limitations of the robot's understanding may lead to the user's dissatisfaction, and if the human service chat is always used as the virtual chat object, the labor cost is too high.

SUMMARY

According to example embodiments of the present disclosure, a technical solution for switching a chat object is provided for optimizing the timing of switching between a robot chat and a human chat.

In a first aspect of the present disclosure, a method for switching a chat object is provided. The method may include: using a robot as a chat object to converse with a user; outputting a target sentiment score based on current discourse, historical discourse, and predicted discourse associated with the user; and switching the chat object conversing with the user from the robot to human in response to the target sentiment score indicating that the user's sentiment is a negative sentiment.

Implementation of the method provided by the first aspect can improve human-machine interactivity and communication efficiency, and ensure the sustainability of communication between a chat system and a user, thus improving the user's satisfaction with the customer service.

In a second aspect of the present disclosure, an electronic device for switching a chat object is provided. The electronic device includes: a processor; and a memory coupled to the processor and having instructions stored therein, where the instructions, when executed by the electronic device, cause the electronic device to perform operations including: using a robot as a chat object to converse with a user; outputting a target sentiment score based on current discourse, historical discourse, and predicted discourse associated with the user; and switching the chat object conversing with the user from the robot to human in response to the target sentiment score indicating that the user's sentiment is a negative sentiment.

Implementation of the electronic device provided by the second aspect can improve human-machine interactivity and communication efficiency, and ensure the sustainability of communication between a chat service system and a user, thus improving the user's satisfaction with the customer service.

In a third aspect of the present disclosure, a computer program product is provided. The computer program product is tangibly stored on a non-transitory computer-readable medium and includes machine-executable instructions, wherein the machine-executable instructions, when executed by a machine, cause the machine to perform the method according to the first aspect of the present disclosure.

In a fourth aspect of the present disclosure, a non-transitory computer-readable storage medium having a computer program stored thereon is provided, wherein the computer program, when executed by a device, causes the device to perform the method according to the first aspect of the present disclosure.

As can be seen from the above description, the solutions according to embodiments of the present disclosure improve the accuracy of prediction of the timing of switching between a robot service and a human service, save labor costs, improve human-machine interactivity and communication efficiency, and ensure the sustainability of communication between a chat service system and a user, thus improving the user's satisfaction with the customer service.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

DETAILED DESCRIPTION

Figure 1:
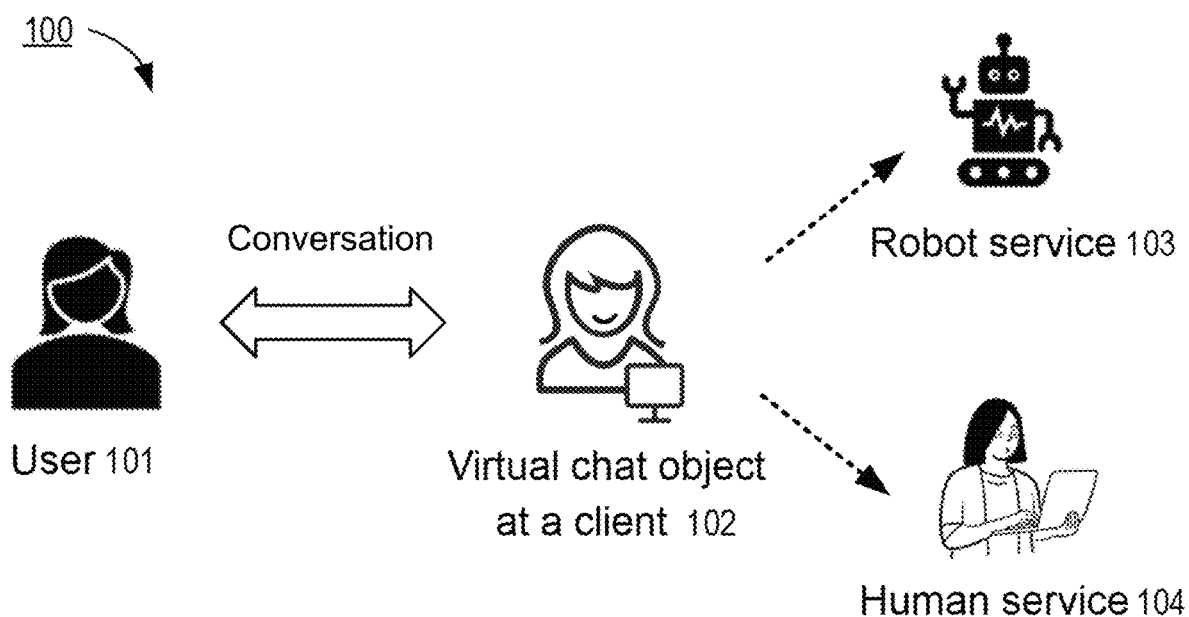
FIG. 1 illustrates a schematic diagram of an application scenario according to some embodiments of the present disclosure.

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In customer service systems of most information service providers, when customers encounter problems in using an information system, they can submit service requests (including titles, abstracts, or detailed descriptions) to a client through a customer service system. The customer service system may provide an online virtual chat object as an interface to communicate with a customer. The virtual chat object may be a robot which fully releases labor costs and improves processing efficiency. In the meta virtual world, the customer may chat with a virtual chat object on the client without knowing whether the virtual chat object is a human service or a robot service. By introducing a virtual chat object, the interactivity between the client and the chat service system is improved. However, if the service is always provided by a robot, the limitations of the robot's understanding may lead to the user's dissatisfaction, and if the human service is always used as the virtual chat object, the labor cost is too high. It is possible to switch between robot services and human services, so that simple and repetitive problems can be handled by a robot, while situations that cannot be handled by a robot can be switched to human. The selection and prediction of the timing of switching between robot services and human services is very important, and the prediction of proper timing of switching can greatly improve the processing efficiency and users' satisfaction. The present disclosure provides embodiments for predicting a more accurate timing for switching the control from a robot to human.

Predicting the timing of switching from robot services to human services is the key to ensuring the sustainability of interactions with users. To improve the accuracy of the timing of switching by predicting shifts in users' utterances, it is required to pay attention not only to local information but also to overall context. Previous algorithms focus only on local information but ignore the overall context, and also require a large amount of specific data for training. The prediction system based on pre-training policies that is provided in the present disclosure is more improved than the prediction system based on aggregation policies, and has higher practicability and accuracy.

Embodiments of the present disclosure provide a method for switching a chat object, a related electronic device, and a related computer program product. The method includes: using a robot as a chat object to converse with a user; outputting a target sentiment score based on current discourse, historical discourse, and predicted discourse associated with the user; and switching the chat object conversing with the user from the robot to human in response to the target sentiment score indicating that the user's sentiment is a negative sentiment.

Implementation of the method provided by the present disclosure can improve the accuracy of prediction of the timing of switching between a robot service and a human service, save labor costs, improve human-machine interactivity and communication efficiency, and ensure the sustainability of communication between a chat service system and a user, thus improving the user's satisfaction with the customer service.

FIG. 1 illustrates a schematic diagram of application scenario 100 provided according to some embodiments of the present disclosure. Application scenario 100 is a schematic diagram of communication between a customer and a chat system. As shown in FIG. 1, user 101 converses with virtual chat object 102 provided by a client to make a demand to the client of the information service provider. Virtual chat object 102 communicating with user 101 may be robot service 103 or human service 104, and whether virtual chat object 102 is robot service 103 or human service 104 will be selected according to a request made by user 101, the predicted sentiment, and other dimensions. Because of the high processing efficiency of robot service 103, robot service 103 is preferred to respond to the request of the user. When the client determines that the request made by user 101 is a simple, easy to handle, and repetitive demand, then robot service 103 can be used as virtual chat object 102 to communicate with user 101. When the client determines that the request made by user 101 is a complex, not easy to understand, and special demand that robot service 103 cannot handle, or when it determines or predicts that the user is about to develop or has developed negative sentiments, then it is possible to switch from robot service 103 to human service 104 which serves as virtual chat object 102 to communicate with user 101 so that the user's demand can be addressed in time. Therefore, the client needs to determine when it needs to access the human service or the robot service. In this way, it is possible to save labor costs and improve communication efficiency while ensuring the sustainability of communication between the chat service system and the user, thus improving the user's satisfaction.

Embodiments of the present disclosure provide an artificial intelligence (AI)/machine learning (ML)-based prediction system for sentiment detection/sentiment analysis that can improve the performance of sentiment detection through multi-scale detection and achieve timely switching between human services and robot services. For specific implementations, reference can be made to the following embodiments.

Figure 2:
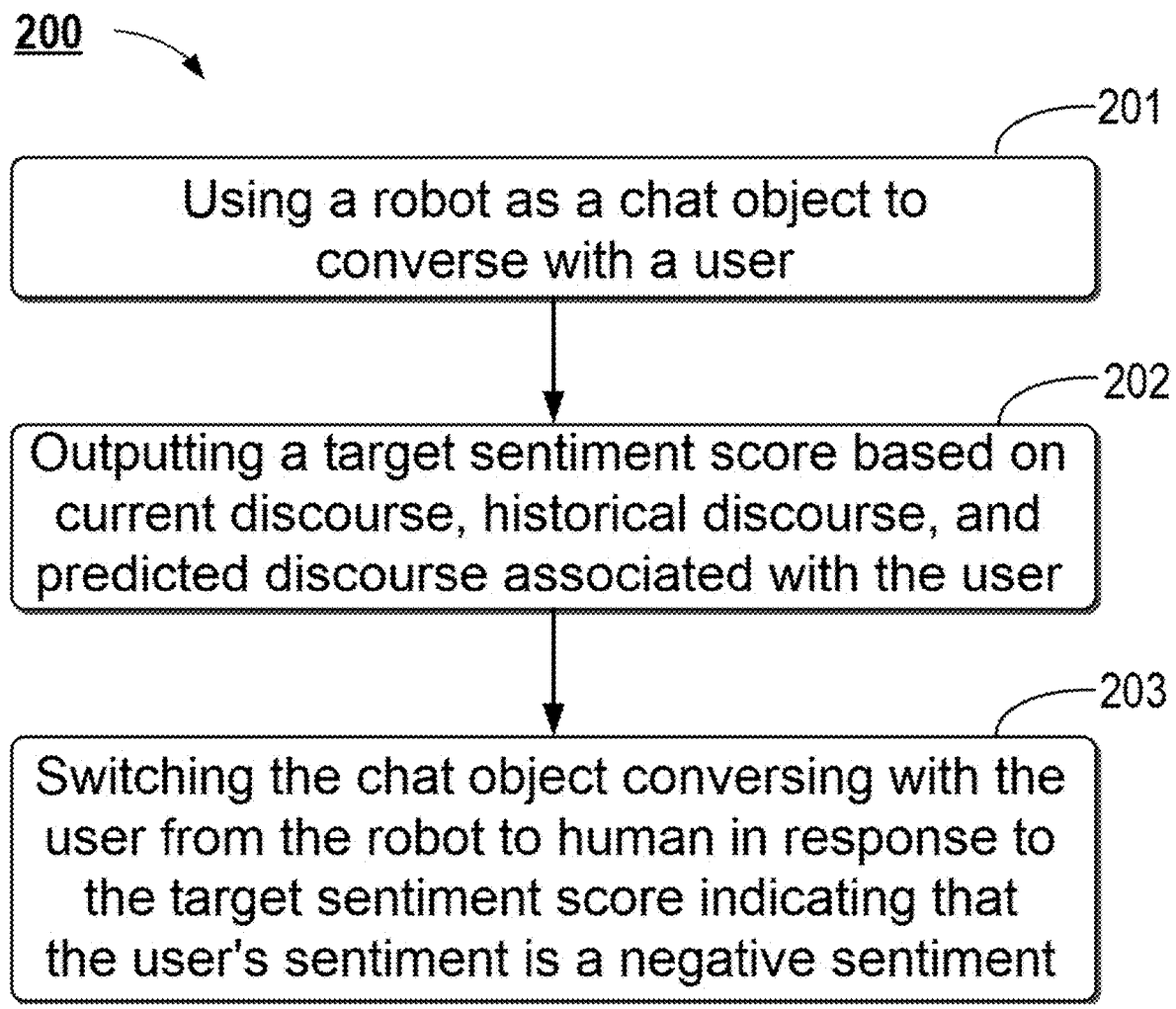
FIG. 2 illustrates a flow chart of a method for switching a chat object according to some embodiments of the present disclosure.

FIG. 2 illustrates a flow chart of method 200 according to some embodiments of the present disclosure. This method 200 may be executed by an electronic device. The electronic device may include, but is not limited to, a personal computer (PC), a server computer, a handheld or laptop device, a mobile terminal, a multiprocessor system, or a combination thereof. Embodiments of the present disclosure do not make any limitation to the device type and the like of the electronic device that implements method 200. It should be understood that, in embodiments of the present disclosure, the subject implementing method 200 may be implemented by an entity device or may be implemented by a plurality of entity devices together. It is to be appreciated that the subject implementing method 200 may be a logical function module in an entity device, or may be a logical function module composed of a plurality of entity devices. It should be understood that, in the following embodiments of the present disclosure, the steps in the method provided in embodiments of the present disclosure may be performed by one entity device, or the steps in the method provided in embodiments of the present disclosure may be performed by a plurality of entity devices cooperatively, which is not limited in embodiments of the present disclosure. It should be understood that method 200 may also include additional blocks that are not shown and/or may omit blocks that are shown, and the scope of the present disclosure is not limited in this regard.

At block 201, a robot is used as a chat object to converse with a user. At block 202, a target sentiment score is output based on current discourse, historical discourse, and predicted discourse associated with the user. At block 203, the chat object conversing with the user is switched from the robot to human in response to the target sentiment score indicating that the user's sentiment is a negative sentiment. Implementation of this method can improve human-machine interactivity and communication efficiency, and ensure the sustainability of communication between a chat service system and a user, thus improving the user's satisfaction with the customer service.

In some embodiments, in response to the target sentiment score indicating that the user's sentiment is a positive sentiment, the conversation with the user continues using the robot service. In some embodiments, the predicted discourse is generated by means of discourse analysis using a long short-term memory (LSTM) neural network model.

In some embodiments, outputting the target sentiment score based on the current discourse, the historical discourse, and the predicted discourse associated with the user may comprise: outputting a comprehensive sentiment score based on inputting the current discourse, the historical discourse, and the predicted discourse associated with the user into corresponding sentiment extraction models respectively; and then outputting the target sentiment score based on inputting the comprehensive sentiment score into a plurality of sentiment prediction models respectively. In some embodiments, the sentiment extraction model extracts an embedding vector by using a bidirectional encoder representations from transformers (BERT) model.

In some embodiments, outputting the comprehensive sentiment score based on inputting the current discourse, the historical discourse, and the predicted discourse associated with the user into the corresponding sentiment extraction models respectively may comprise: inputting the current discourse into a first sentiment extractor, and outputting a first sentiment score; inputting the historical discourse into a second sentiment extractor, and outputting a second sentiment score; inputting the predicted discourse into a third sentiment extractor, and outputting a third sentiment score; and outputting the comprehensive sentiment score based on the first sentiment score, the second sentiment score, and the third sentiment score.

In some embodiments, outputting the comprehensive sentiment score based on the first sentiment score, the second sentiment score, and the third sentiment score may comprise: inputting the first sentiment score, the second sentiment score, and the third sentiment score into a self-attention model, and outputting the comprehensive sentiment score by the self-attention model.

In some embodiments, outputting the target sentiment score based on inputting the comprehensive sentiment score into the plurality of sentiment prediction models respectively may comprise: inputting the comprehensive sentiment score into a plurality of sentiment predictors respectively to obtain corresponding primary sentiment scores respectively; and obtaining the target sentiment score based on the plurality of primary sentiment scores corresponding to the plurality of sentiment predictors.

In some embodiments, obtaining the target sentiment score based on the plurality of primary sentiment scores corresponding to the plurality of sentiment predictors may comprise: inputting the plurality of primary sentiment scores into a random forest model; and outputting the target sentiment score by the random forest model.

In some embodiments of the present disclosure, the robot for chatting with the user may use an LSTM neural network to generate responses. LSTM neural networks overcome the gradient disappearance problem experienced by recurrent neural networks (RNNs). By using a multiplication gate, a constant error flow is forced through the internal state of a special cell called "memory cell." Input gate (IG), output gate (OG), and forgetting gate (FG) prevent the memory content from being disturbed by irrelevant inputs and outputs, thus allowing long-term memory storage. Since LSTM networks have the capability of learning long-term correlations in sequences, they do not require a pre-specified time window and are capable of accurately modeling complex multivariate sequences.

The robot service, in order to achieve automatic responses, may include the following steps: first, cleaning data, which may include removing non-English requests and requests with images; second, tokenizing the data and establishing a vocabulary of the 100,000 most frequent words in users' conversations; third, generating word embedding features and training a word2vec model with the collected corpus, where each word in the vocabulary is represented as a 640-dimensional vector; and fourth, training an LSTM neural network, wherein the input and output of the LSTM neural network are vector representations of a word sequence, with one word being encoded or decoded at a time. In view of the fact that a deep LSTM neural network is obviously superior to a shallow LSTM neural network in reported sequence-to-sequence tasks, the deep LSTM neural network can be trained using random gradient descent and gradient shearing, jointly with 5 layers×640 memory units.

In some embodiments of the present disclosure, BERT may be used as an embedding extraction module. The system of this embodiment can use BERT to extract an embedding vector from the input. BERT can be used for text classification. BERT is to apply bidirectional training of a transformer (an attention model) to language modeling and to fine-tune the language model for a specific task.

In some embodiments of the present disclosure, the user's sentiment is used as a basis for detection. The yield shift theory (YST) of satisfaction may be used to explain why it is expected to be able to establish an intervention threshold by monitoring the user's sentiments, i.e., the effectiveness of sentiments in a chat service system. YST assumes that individuals subconsciously and automatically assign utility and likelihood to each goal they wish to achieve. Utility is the perceived benefit associated with goal attainment. Likelihood is the perceived probability of achieving a goal. The product of utility and likelihood determines the perceived yield (i.e., yield=utility×likelihood), i.e., likelihood moderates the effect of utility on yield. Thus, the yields associated with high utility and low likelihood goals may be lower than the yields associated with low utility and high likelihood goals.

The phenomenon of interest in YST is a satisfaction response, which is a sentiment. Satisfaction responses are determined by changes in perceived rewards over time. YST proposes three theoretical strategies to induce changes in yields: first, changing an individual's utility for his or her positive goal; second, changing the likelihood that the individual achieves the goal; and third, changing the setting of the positive goal. Chatbots are most likely to induce changes in yields in the first two ways, i.e., changes in perceived utility or changes in perceived likelihood. For example, assuming that a customer uses a support chatbot to return an item, if the chatbot tells the customer that the return will incur a 20% restocking fee, this will produce a negative utility shift, i.e., the customer changes his or her mind about the return after receiving new information about the fee. However, if the chatbot is unable to find the customer's order, this creates a negative likelihood shift, that is, the customer loses the belief that the chatbot can effectively solve the problem. This change in utility or likelihood leads to a change in yield, which triggers a satisfying response, i.e., sentiment, which can be found in the user's discourse to the chatbot. Thus, YST can provide a theoretical framework for establishing thresholds for human intervention.

The present disclosure provides a hybrid sentiment detection algorithm based on multi-scale inputs and multiple detectors and a prediction system for switching human services and robot services that is based on multi-scale inputs of sentiments (using user sentiments as a basis for switching prediction). The integration of multi-scale inputs can provide more accurate and reasonable predictions, while the hybrid system can significantly reduce the prediction error of the system. Thus, points of concern in problem solving in embodiments of the present disclosure include how to utilize multi-scale inputs and how to integrate results from different predictors.

Figure 3:
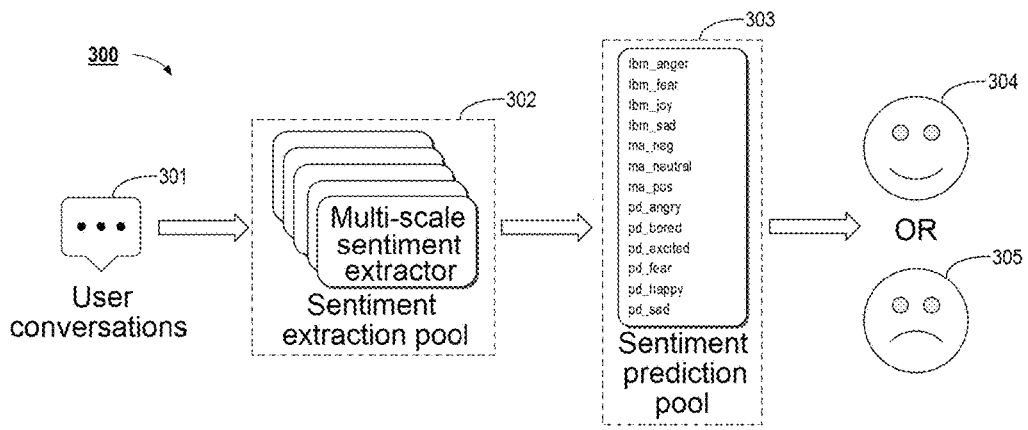
FIG. 3 illustrates a schematic diagram of a sentiment extraction and prediction system according to some embodiments of the present disclosure.

A sentiment extraction and prediction system provided by embodiments of the present disclosure is described below. FIG. 3 illustrates framework 300 of a sentiment extraction and prediction system provided by embodiments of the present disclosure. A plurality of user conversations 301 are first input to sentiment extraction pool 302, and user conversations 301 can be classified as multi-scale inputs such as current discourse, historical discourse, and predicted discourse. Sentiment extraction pool 302 includes a plurality of sentiment extraction models (sentiment extractors), and a multi-scale sentiment output can be output based on respectively inputting the classified conversations such as the current discourse, the historical discourse, and the predicted discourse associated with the user into corresponding sentiment extraction models in sentiment extraction pool 302, and then a comprehensive sentiment score based on the multi-scale sentiment output is output using a self-attention mechanism. Sentiment prediction pool 303 may include a plurality of sentiment prediction models, and the comprehensive sentiment score may be input into a corresponding plurality of sentiment prediction models via different application program interfaces (APIs). The comprehensive sentiment score is input into the plurality of sentiment prediction models respectively to obtain corresponding primary sentiment scores respectively. A target sentiment score is finally output based on the weighted combination of the results of the plurality of primary sentiment scores corresponding to the plurality of sentiment prediction models (sentiment predictors). The target sentiment score may indicate the user's sentiment, such as positive sentiment 304 (e.g., happy) or negative sentiment 305 (e.g., angry). The finally obtained target sentiment is used to determine the timing of switching between human services and robot services.

In the system provided in this embodiment, a plurality of discourses of the user conversation are input into the sentiment extraction model, including, for example, the current discourse, the next round of discourse, and the skipped round of discourse. In the sentiment extraction pool, sentiments with comprehensive contextual information are extracted using a multi-scale sentiment extractor. Sentiment prediction pool 303 is then a hybrid system that mixes a variety of weighted aggregation blocks and can thus combine predictions in different formats and produce a final prediction result of the user sentiment, such as happy or angry. If the predicted sentiment is negative, then a human service may be required to engage in this conversation, but if the customer's sentiment is positive, then the chatbot service can be allowed to continue to solve the user's problem.

Figure 4A:
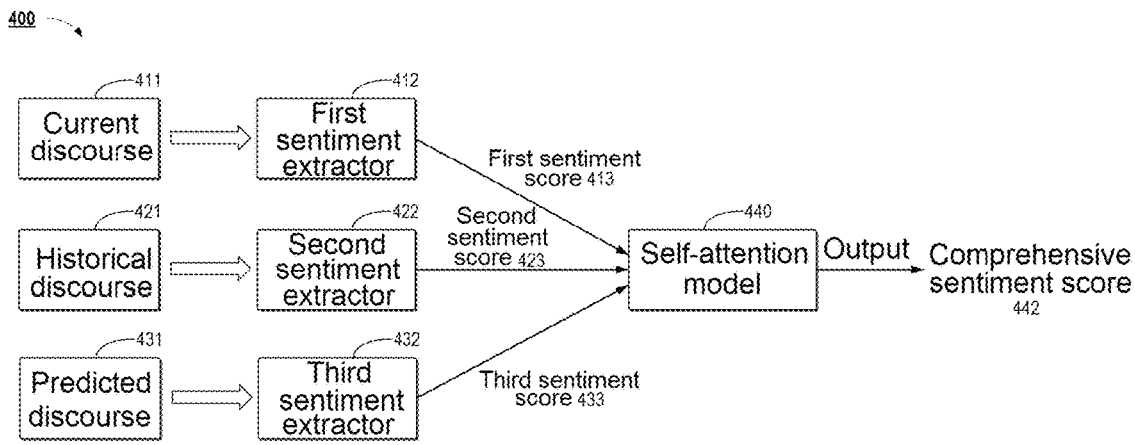
FIG. 4A illustrates an example process diagram of sentiment extraction according to some embodiments of the present disclosure.

FIG. 4A illustrates specific example process 400 of a sentiment extraction pool. The multi-scale inputs allow for more interpretability and clarity in sentiment prediction. Embodiments of the present disclosure provide a sentiment extractor (also referred to as sentiment extraction module) based on multi-scale inputs. In a multi-scale sentiment extractor, the embedding vector is processed directly, regardless of the process before the conventional sentiment extraction embedding vector. In the present disclosure, BERT may be used to extract an embedding vector from an input sequence that is the discourse in the conversation with the user. This model also enables the multi-scale sentiment extraction framework to be easily extended to other applications.

The multi-scale inputs in embodiments of the present disclosure may include at least three types of inputs: direct information, historical information, and predictive information (future information). To predict the customer's sentiment, it is necessary to first know the sentiment of his/her current speech (direct information), so first sentiment extractor (which can be a normal sentiment extractor, also referred to as regular sentiment extractor) 412 will predict the sentiment based on current discourse 411. The user's sentiment will not change suddenly, and the process of sentiment change should be smooth. Therefore, a smooth factor may be added by introducing historical discourse 421. In a smooth sentiment extractor (i.e., second sentiment extractor 422), the information that is input is the previous sentence of this user, which contains historical sentiment information. In this way, the result of sentiment prediction can also be improved. Third input predicted discourse 431 and corresponding third sentiment extractor (which can be referred to as predicted sentiment extractor or predicted-sentiment extractor) 432 should encode the future information, which is predicted by the chatbot based on the LSTM neural network. This does not require additional computation to predict the future situation, but only needs to use the output of the chatbot and predict the sentiment, and the outputs of different sentiment extractors can then be better utilized.

With continued reference to FIG. 4A, current discourse 411 is input into first sentiment extractor 412 that outputs first sentiment score 413. Historical discourse 421 is input to second sentiment extractor 422 that outputs second sentiment score 423. Predicted discourse 431 is input to third sentiment extractor 432 that outputs third sentiment score 433. First sentiment score 413, second sentiment score 423, and third sentiment score 433 are then input into self-attention model 440, and comprehensive sentiment score 442 is output through self-attention model 440. In embodiments of the present disclosure, they are combined using different sentiment extraction algorithms to generate a more accurate prediction result.

Figure 4B:
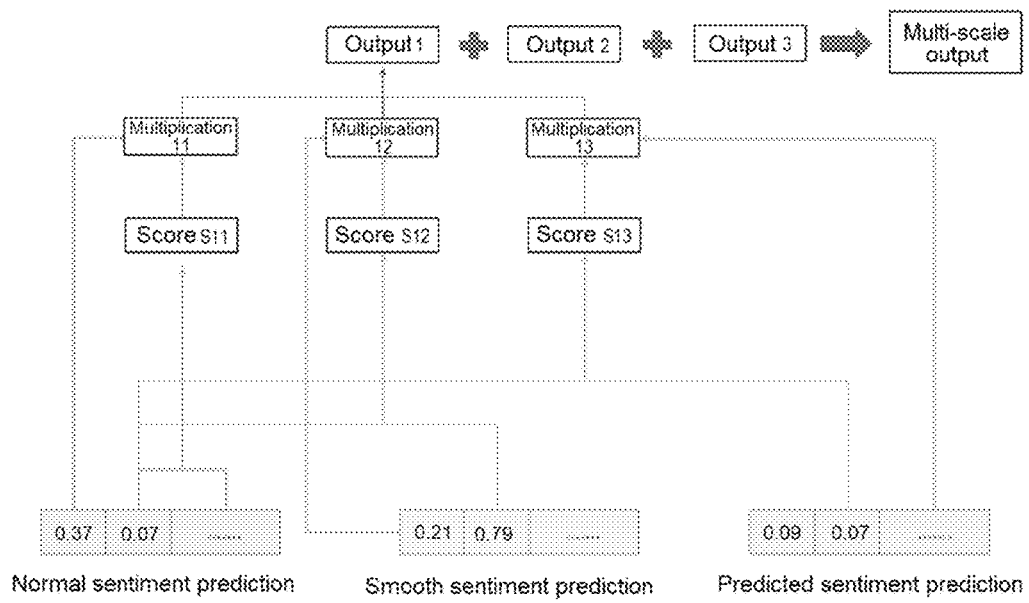
FIG. 4B illustrates an example diagram of computing a multi-scale output according to some embodiments of the present disclosure.

The self-attention module is a key component in the result fusion process. In embodiments of the present disclosure, instead of directly using the computational process of self-attention as proposed in BERT, the computational process is simplified. Referring to FIG. 4B, in one example, instead of using the Q, K, and V vectors in the original self-attention algorithm, these vectors are replaced with one single vector, i.e., the embedding vector e of the system. Then, the cosine similarity between each of the systems can be computed first to obtain a score S (scalar) for each component, and then the embedding vector can be multiplied with the corresponding similarity score to obtain a multiplication vector. Finally, the output of the sentiment extractor embedding vector can be obtained by simply adding the three multiplication vectors (e.g., $e_{out1}=e_1 \times S_{11}+e_1 \times S_{12}+e_1 \times S_{13}$). The above process is then repeated to obtain outputs of the other sentiment extractors, and the total sum of all these outputs is subjected to normalization processing to generate the final multi-scale output, i.e., comprehensive sentiment score 442.

Figure 5:
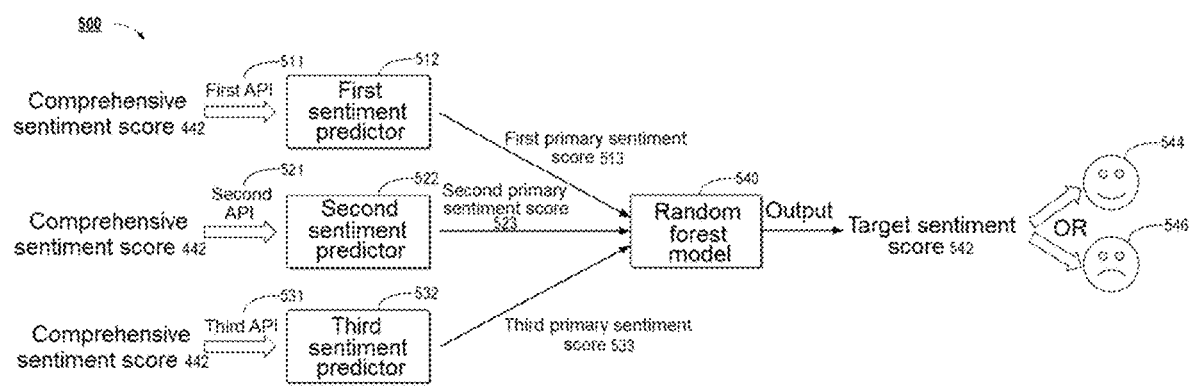
FIG. 5 illustrates an example process diagram of sentiment prediction according to some embodiments of the present disclosure.

FIG. 5 illustrates specific example process 500 for a sentiment prediction pool (hybrid prediction system). In the present disclosure, a number of APIs may be employed to use a pre-trained model in order to reduce computational costs. To further improve the prediction results, in embodiments of the present disclosure, a plurality of APIs can be utilized, and an integrated system based on a random forest model is provided.

In the example as shown in FIG. 5, comprehensive sentiment score 442 can be respectively input into a plurality of sentiment predictors to obtain corresponding primary sentiment scores respectively. For example, it is input to first sentiment predictor 512 via first API 511 to obtain first primary sentiment score 513; it is input to second sentiment predictor 522 via second API 521 to obtain second primary sentiment score 523; and it is input to third sentiment predictor 532 via third API 531 to obtain third primary sentiment score 533. First primary sentiment score 513, second primary sentiment score 523, and third primary sentiment score 533 can then be input into random forest model 540. Target sentiment score 542 is output via random forest model 540. Based on target sentiment score 542, it can be determined whether the user's sentiment is positive sentiment 544 or negative sentiment 546.

Some examples of directly usable sentiment analysis APIs and sentiment outputs are for example: Microsoft Azure (MA) Text Analysis 2: positive (ma_pos), neutral (ma_neutral), negative (ma_neg); Parallel Points (PD) Text Analysis 3: happy (pd_happy), angry (pd_angry), excited (pd_excited), sad (pd_sad), fearful (pd_fear), and bored (pd_bored); and IBM Watson Tone Analyzer 4: angry (ibm_angry), fearful (ibm_fear), joyful (ibm_joy), and sad (ibm_sad). As can be understood, these are only examples to support embodiments of the present disclosure and do not limit other embodiments of the present disclosure, and in other embodiments, other APIs or other means may also be employed to input sentiment data into the sentiment prediction model.

In embodiments of the present disclosure, after obtaining the plurality of primary sentiment scores based on different APIs, the weighted integration module can be implemented using random forest model 540. In order to combine outputs of different formats in a self-adaptive approach, it is possible to choose to use a random forest approach to combine outputs of a plurality of uncorrelated decision trees into one single classification estimation. Individual trees are created using different random subsets of original data and features. These subsets of data are referred to as respective "bags." Each bag is used to train one decision tree. Any remaining data is considered "out-of-bag" (OOB) and is used to evaluate a trained decision tree. Thus, OOB data accuracy is evaluated during training. This bootstrap approach can prevent overfitting. The number of trees can be set as 500 in both models with the angry output combination and the happy output combination.

Illustrative embodiments of the present disclosure provide comprehensive context information in the process of sentiment prediction, a multi-scale input is realized according to multiple utterances of user conversation, a hybrid solution of sentiment extraction and sentiment detection is provided, and different sentiment extraction algorithms are used to combine them. In an embodiment of the present disclosure, a method for bidirectional seamless switching of a chat object (robot service-human service) is provided. Implementation of this method can improve human-machine interactivity and communication efficiency, save labor costs, and ensure the sustainability of communication between a chat service system and a user, thus improving the user's satisfaction with the customer service. This switching process is bidirectional and flexible, which, compared with the conventional unidirectional switching, can expand the support capacity of the human service to a large extent, improve communication efficiency, and handle more requests. In a conventional setup, if there is only one support person serving customers, then the support person can only handle one customer's request. With the addition of a chatbot, the support person only needs to start handling requests after switching from the chatbot. In embodiments of the present disclosure, the support person only needs to handle necessary questions and can feed a call back to the chatbot at any time. Also, the support person may not be very familiar with some virtual issues, while the chatbot can easily address such issues. Thus, embodiments of the present disclosure can make full use of the advantages of human and robots, thereby providing better customer experience with higher efficiency and less labor, reducing response delays, and increasing customer satisfaction.

It should be understood that the architecture illustrated in FIG. 3, FIG. 4A, or FIG. 5 above is only schematic, and depending on practical applications, the architecture illustrated in FIG. 3, FIG. 4A, or FIG. 5 may be in other different forms, and may also include a higher or lower number of one or more functional modules and/or units for user sentiment extraction and prediction. These modules and/or units may be partially or fully implemented as hardware modules, software modules, firmware modules, or any combination thereof, and embodiments of the present disclosure are not limited in this regard.

Figure 6:
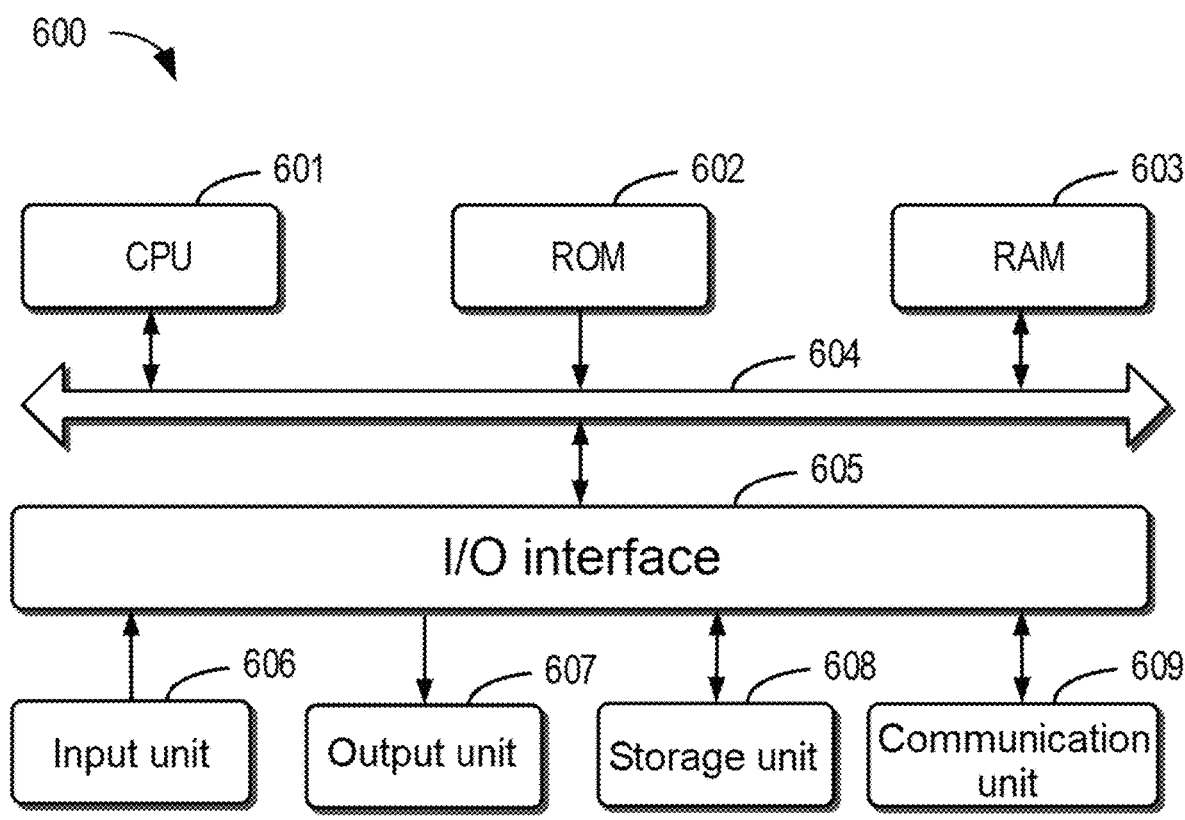
FIG. 6 illustrates a schematic structural diagram of a device that can be configured to implement embodiments of the present disclosure.

FIG. 6 illustrates a schematic structural diagram of example device 600 that can be configured to implement some embodiments of the present disclosure. Device 600 may be implemented as a server or a PC. Embodiments of the present disclosure do not limit the specific implementation type of device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network such as the Internet and/or various telecommunication networks.

CPU 601 may execute the various methods and/or processing described above, such as method 200. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. When the computer program is loaded onto RAM 603 and executed by CPU 601, one or more steps of method 200 described above may be performed. Alternatively, in other embodiments, CPU 601 may be configured to perform method 200 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should not be understood as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for switching a chat object, the method comprising:
    using a robot as a chat object to converse with a user, wherein the robot is implemented at least in part utilizing at least one neural network of a processor-based machine learning system;
    outputting a target sentiment score based on current discourse, historical discourse, and predicted discourse associated with the user, wherein the predicted discourse is generated at least in part by the at least one neural network utilized in implementing the robot, and the target sentiment score is generated by applying the current discourse, the historical discourse and the predicted discourse to respective different extraction models of the processor-based machine learning system, and processing outputs of the respective different extraction models in an additional machine learning model of the processor-based machine learning system to generate the target sentiment score; and
    switching the chat object conversing with the user from the robot to human in response to the target sentiment score indicating that the user's sentiment is a negative sentiment.

2. The method according to claim 1, wherein the outputting the target sentiment score based on current discourse, historical discourse, and predicted discourse associated with the user comprises:
    outputting a comprehensive sentiment score based on inputting the current discourse, the historical discourse, and the predicted discourse associated with the user into corresponding sentiment extraction models respectively; and
    outputting the target sentiment score based on inputting the comprehensive sentiment score into a plurality of sentiment prediction models respectively.

3. The method according to claim 2, wherein the outputting the comprehensive sentiment score based on inputting the current discourse, the historical discourse, and the predicted discourse associated with the user into corresponding sentiment extraction models respectively comprises:
    inputting the current discourse into a first sentiment extractor, and outputting a first sentiment score;
    inputting the historical discourse into a second sentiment extractor, and outputting a second sentiment score;
    inputting the predicted discourse into a third sentiment extractor, and outputting a third sentiment score; and
    outputting the comprehensive sentiment score based on the first sentiment score, the second sentiment score, and the third sentiment score.

4. The method according to claim 3, wherein the outputting the comprehensive sentiment score based on the first sentiment score, the second sentiment score, and the third sentiment score comprises:
    inputting the first sentiment score, the second sentiment score, and the third sentiment score into a self-attention model; and
    outputting the comprehensive sentiment score by the self-attention model.

5. The method according to claim 2, wherein the outputting the target sentiment score based on inputting the comprehensive sentiment score into a plurality of sentiment prediction models respectively comprises:
    inputting the comprehensive sentiment score into a plurality of sentiment predictors respectively to obtain corresponding primary sentiment scores respectively; and
    obtaining the target sentiment score based on the plurality of primary sentiment scores corresponding to the plurality of sentiment predictors.

6. The method according to claim 5, wherein the obtaining the target sentiment score based on the plurality of primary sentiment scores corresponding to the plurality of sentiment predictors comprises:
    inputting the plurality of primary sentiment scores into a random forest model; and
    outputting the target sentiment score by the random forest model.

7. The method according to claim 2, wherein the sentiment extraction model extracts an embedding vector by using a pre-trained bidirectional encoder representations from transformers (BERT) model.

8. The method according to claim 1, wherein the predicted discourse is generated by means of discourse analysis using a long short-term memory (LSTM) neural network model.

9. The method according to claim 1, further comprising:
continuing to use the robot to converse with the user in response to the target sentiment score indicating that the user's sentiment is a positive sentiment.

10. An electronic device for switching a chat object, comprising:
at least one processor; and
memory coupled to the at least one processor and having instructions stored therein, wherein the instructions, when executed by the at least one processor, cause the electronic device to perform operations comprising:
using a robot as a chat object to converse with a user, wherein the robot is implemented at least in part utilizing at least one neural network of a processor-based machine learning system;
outputting a target sentiment score based on current discourse, historical discourse, and predicted discourse associated with the user, wherein the predicted discourse is generated at least in part by the at least one neural network utilized in implementing the robot, and the target sentiment score is generated by applying the current discourse, the historical discourse and the predicted discourse to respective different extraction models of the processor-based machine learning system, and processing outputs of the respective different extraction models in an additional machine learning model of the processor-based machine learning system to generate the target sentiment score; and
switching the chat object conversing with the user from the robot to human in response to the target sentiment score indicating that the user's sentiment is a negative sentiment.

11. The electronic device according to claim 10, wherein the outputting the target sentiment score based on current discourse, historical discourse, and predicted discourse associated with the user comprises:
outputting a comprehensive sentiment score based on inputting the current discourse, the historical discourse, and the predicted discourse associated with the user into corresponding sentiment extraction models respectively; and
outputting the target sentiment score based on inputting the comprehensive sentiment score into a plurality of sentiment prediction models respectively.

12. The electronic device according to claim 11, wherein the outputting the comprehensive sentiment score based on inputting the current discourse, the historical discourse, and the predicted discourse associated with the user into corresponding sentiment extraction models respectively comprises:
inputting the current discourse into a first sentiment extractor, and outputting a first sentiment score;
inputting the historical discourse into a second sentiment extractor, and outputting a second sentiment score;
inputting the predicted discourse into a third sentiment extractor, and outputting a third sentiment score; and
outputting the comprehensive sentiment score based on the first sentiment score, the second sentiment score, and the third sentiment score.

13. The electronic device according to claim 12, wherein outputting the comprehensive sentiment score based on the first sentiment score, the second sentiment score, and the third sentiment score comprises:
inputting the first sentiment score, the second sentiment score, and the third sentiment score into a self-attention model; and
outputting the comprehensive sentiment score by the self-attention model.

14. The electronic device according to claim 11, wherein the outputting the target sentiment score based on inputting the comprehensive sentiment score into a plurality of sentiment prediction models respectively comprises:
inputting the comprehensive sentiment score into a plurality of sentiment predictors respectively to obtain corresponding primary sentiment scores respectively; and
obtaining the target sentiment score based on the plurality of primary sentiment scores corresponding to the plurality of sentiment predictors.

15. The electronic device according to claim 14, wherein the obtaining the target sentiment score based on the plurality of primary sentiment scores corresponding to the plurality of sentiment predictors comprises:
inputting the plurality of primary sentiment scores into a random forest model; and
outputting the target sentiment score by the random forest model.

16. The electronic device according to claim 11, wherein the sentiment extraction model extracts an embedding vector by using a pre-trained bidirectional encoder representations from transformers (BERT) model.

17. The electronic device according to claim 10, wherein the predicted discourse is generated by means of discourse analysis using a long short-term memory (LSTM) neural network model.

18. The electronic device according to claim 10, wherein the operations further comprise:
continuing to use the robot to converse with the user in response to the target sentiment score indicating that the user's sentiment is a positive sentiment.

19. A computer program product, the computer program product being tangibly stored on a non-transitory computer-readable medium and comprising machine-executable instructions, wherein the machine-executable instructions, when executed by a machine, cause the machine to perform operations comprising:
using a robot as a chat object to converse with a user, wherein the robot is implemented at least in part utilizing at least one neural network of a processor-based machine learning system;
outputting a target sentiment score based on current discourse, historical discourse, and predicted discourse associated with the user, wherein the predicted discourse is generated at least in part by the at least one neural network utilized in implementing the robot, and the target sentiment score is generated by applying the current discourse, the historical discourse and the predicted discourse to respective different extraction models of the processor-based machine learning system, and processing outputs of the respective different extraction models in an additional machine learning model of the processor-based machine learning system to generate the target sentiment score; and switching the chat object conversing with the user from the robot to human in response to the target sentiment score indicating that the user's sentiment is a negative sentiment.

20. The computer program product according to claim 19, wherein the outputting the target sentiment score based on current discourse, historical discourse, and predicted discourse associated with the user comprises:
  outputting a comprehensive sentiment score based on inputting the current discourse, the historical discourse, and the predicted discourse associated with the user into corresponding sentiment extraction models respectively; and
  outputting the target sentiment score based on inputting the comprehensive sentiment score into a plurality of sentiment prediction models respectively.

* * * * *